US008993140B2

(12) United States Patent
Schiemann et al.

(10) Patent No.: US 8,993,140 B2
(45) Date of Patent: Mar. 31, 2015

(54) RECHARGEABLE BATTERY CELL AND BATTERY

(75) Inventors: Michael Schiemann, Berlin (DE); Peter Birke, Glienicke/Nordbahn (DE); Carsten Patzelt, Berlin (DE); Hans-Georg Schweiger, Ingolstadt (DE); Bjoern Ripp, Berlin (DE)

(73) Assignee: Continental Automotive GmbH, Hannover (DE)

( * ) Notice: Subject to any disclaimer, the term of this patent is extended or adjusted under 35 U.S.C. 154(b) by 50 days.

(21) Appl. No.: 13/805,100

(22) PCT Filed: Jun. 9, 2011

(86) PCT No.: PCT/EP2011/059559
§ 371 (c)(1),
(2), (4) Date: Dec. 18, 2012

(87) PCT Pub. No.: WO2011/157618
PCT Pub. Date: Dec. 22, 2011

(65) Prior Publication Data
US 2013/0089761 A1    Apr. 11, 2013

(30) Foreign Application Priority Data

Jun. 18, 2010  (DE) .................. 10 2010 024 235

(51) Int. Cl.
| H01M 8/04 | (2006.01) |
| H01M 10/04 | (2006.01) |
| H01M 2/02 | (2006.01) |
| H01M 2/20 | (2006.01) |
| H01M 2/26 | (2006.01) |
| H01M 10/12 | (2006.01) |
| H01M 10/0525 | (2010.01) |

(52) U.S. Cl.
CPC ........ *H01M 10/0413* (2013.01); *H01M 2/0242* (2013.01); *H01M 2/206* (2013.01);
(Continued)

(58) Field of Classification Search
CPC ............ Y02T 10/7005; Y02T 10/7061; Y02T 10/7044; Y02T 10/7055; Y02T 90/128; B60L 11/1879; B60L 11/1861; B60L 11/1864; G01R 31/3658; H01M 10/052; H01M 10/482; H01M 10/424; H01M 2010/4271; H01M 2010/4278
USPC ..................................................... 429/61, 149
See application file for complete search history.

(56) References Cited

U.S. PATENT DOCUMENTS

| 5,866,274 A | 2/1999 | Mawston et al. |
| 8,283,072 B2 | 10/2012 | Ando et al. |

(Continued)

FOREIGN PATENT DOCUMENTS

| CA | 2380945 A1 | 10/2003 |
| DE | 19611776 A1 | 9/1996 |

(Continued)

*Primary Examiner* — Cynthia H Kelly
*Assistant Examiner* — Monique Wills
(74) *Attorney, Agent, or Firm* — Laurence A. Greenberg; Werner H. Stemer; Ralph E. Locher (57) ABSTRACT

A rechargeable battery cell has at least one energy-optimized cell unit and at least one power-optimized cell unit. The power-optimized cell unit is configured in such a way that it can be used to generate a higher power than with the energy-optimized cell unit. The energy-optimized cell unit is configured in such a way that it can be used to store a higher quantity of energy per volume of the energy-optimized cell unit and/or per mass of the energy-optimized cell unit than with the power-optimized cell unit. The at least one energy-optimized cell unit and the at least one power-optimized cell unit are arranged in a common cell housing.

24 Claims, 7 Drawing Sheets

(52) U.S. Cl.
CPC ......... *H01M 2/266* (2013.01); *H01M 10/0445* (2013.01); *H01M 10/122* (2013.01); *H01M 10/0525* (2013.01); *Y02E 60/126* (2013.01); *Y02T 10/7016* (2013.01)
USPC .......................................... 429/61; 429/149

(56) References Cited

U.S. PATENT DOCUMENTS

| | | |
|---|---|---|
| 2006/0208692 A1 | 9/2006 | Kejha |
| 2008/0113226 A1* | 5/2008 | Dasgupta et al. ................ 429/9 |
| 2008/0193832 A1 | 8/2008 | Doffin et al. |
| 2009/0169987 A1* | 7/2009 | Miyazaki et al. ............. 429/158 |
| 2011/0206950 A1 | 8/2011 | Doege |

FOREIGN PATENT DOCUMENTS

| | | |
|---|---|---|
| DE | 102005029836 A1 | 1/2007 |
| DE | 102005038351 A1 | 2/2007 |
| DE | 102007041526 A1 | 2/2009 |
| EP | 2040320 A1 | 3/2009 |
| WO | 2007017506 A1 | 2/2007 |

* cited by examiner

RECHARGEABLE BATTERY CELL AND BATTERY

BACKGROUND OF THE INVENTION

Field of the Invention

The invention relates to a rechargeable battery cell with at least one energy-optimized cell unit and at least one power-optimized cell unit, which makes it possible to provide high levels of power for relatively short times in motor vehicles and also to provide a high rated capacity and high energy content. The invention also relates to a battery which meets these requirements.

Every motor vehicle needs an electrical energy source that is available at any time in order for it to operate. This energy source has the task of supplying for example the starter, the ignition system, the headlights and other power consumers with electrical energy.

As long as the internal combustion engine is running at a sufficiently high speed, the electrical energy provided by the electric generator is available. By contrast, when the engine is at a standstill, for example when parking, or when it is started, an energy source or an energy store that is independent of the engine is required.

In principle, various power sources would be suitable for this, but sometimes technical reasons and sometimes economic reasons stand in the way of them being used. Of the various types of rechargeable battery (for example lead, nickel-cadmium, nickel-metal hydride, nickel-zinc, silver-zinc rechargeable batteries, etc.), the lead battery has established itself as a starter battery for motor vehicles because of its low price and the long experience with the technology (invented in 1860, it has been used as a starter battery since about 1915). The lead-acid battery is also in widespread use in many other areas of small traction, such as in the case of lifting platforms, wheelchairs for the sick, trailers or mobile homes, cleaning machines, etc. With the development of new rechargeable battery technologies, in particular lithium-ion technology, there are an increasing number of technologically better alternatives available to take over from the established lead battery.

At the same time, the requirements for the starter battery are many and varied. On the one hand, the battery is intended to have as good a starting power as possible, even at temperatures of −30° C., but on the other hand it is also intended to have good energy/capacity, in order to start the vehicle reliably even after a lengthy period of inactivity of over six weeks. In addition, a long cyclic or calendar service life is required.

While in the area of starters, the lead-acid battery has continuously undergone improvements since around 1915 as far as the power capacity and lifetime are concerned, optimizations in the direction of application to other cells/batteries, such as for example on a lithium-ion basis, have not by any means all been adopted thus far.

The problem of replacing the starter battery of a lead-acid battery with a battery with lithium-ion cells is that the current types of cell do not yet fully meet the requirements for a starter battery. This is so because at present lithium-ion cells are largely optimized in three directions for production in large numbers. These main types are presented below with their main properties, specifically with respect to suitability for starter batteries:

Consumer Types

These lithium-ion cells are produced in standardized housings, usually 18650 or 26650 (in a cylindrical housing) and have the advantage of great availability and low costs. However, the capacity to provide high power, in particular at low temperatures down to −25° C., is limited and the typical rated capacities are only about 2 to 3 Ah. To construct a starter battery with about 60 Ah, consequently up to 120 cells (30 in parallel×4 in series connection) are required, depending on the type of cell, in order also correspondingly to achieve high power requirements at temperatures even anywhere near to as low as −25° C. However, a correspondingly high number of cells rapidly presents problems in the mechanical construction, such as for example the electrical contacting and the monitoring of all the cells. The aims of a low volume and weight of the battery block, a main advantage of the lithium-ion technology, are difficult to achieve in the use of consumer cells in comparison with lead-acid technology.

Power-Optimized Cells

This type of cell represents the optimum for starter batteries with respect to high starting currents or high starting power. The design of this cell is optimized by way of the number of electrodes, the thickness of the electrodes and the conducting-lead elements, in such a way that the cells can deliver maximum currents of up to 50 C (50 times the rated capacity). The value C (also known as a C value or C rate) gives the amount of load current/discharge current or charge current/discharge current in amperes in relation to the (divided by the) nominal total capacity.

Since, however, the power optimization takes place by way of the increased number of electrode layers and a smaller layer thickness of the electrode layers, this type of cell displays lower volumetric and gravimetric energy densities than an energy-optimized cell, and so the capacity per mass or volume is lower. Apart from higher weight and higher volume per ampere hour, this leads to an overdimensioning of the power in continuous operation.

Energy-Optimized Cells

Energy-optimized cells represent the optimum for batteries with a demand for high rated capacities or energy contents. The design of this cell is optimized by way of the thickness of the electrode layers for a high gravimetric and volumetric energy density. However, this optimization leads to relatively higher resistances per ampere hour of rated capacity. For continuous operation in an electric vehicle, discharge currents of 1 C to 3 C are typical, but for a starter battery much higher discharge currents are required per cell in the starting operation. This has the effect that the requirements for the starting currents of a 60 Ah lead-acid battery are only reached if a very high number of energy-optimized cells are connected in parallel. The result is consequently an overdimensioning with respect to rated capacity, and consequently also in terms of weight, volume and costs.

The following distinction is to be made here between cells and batteries.

The cell, or the galvanic cell, converts chemical energy into electrical energy. The galvanic cell has at least one positive electrode and one negative electrode, at least one separator and the electrolyte. The cells are divided into primary and secondary cells (derived from the terminology that refers to a primary and secondary battery). In the case of primary cells, the chemical energy is converted into electrical energy, and only in this direction. In the case of secondary elements, the process is reversible. The capacity of the cell is substantially determined by its size (therefore by the size of the electrodes and the number of parallel connections of the electrodes in the cell); however, the cell voltage is always a function of the fundamental electrochemistry of the element. The cell is the basic element for the connection of individual cells to form a battery.

Individual cells are connected to form batteries (sometimes also referred to as battery packs), in order to increase the voltage (by series connection) or the capacity (by parallel connection). In this case, the cells are electrically interconnected to form a unit. The connection takes place by way of the cell poles (outer conducting-lead elements). The cells may initially be connected here in series to form small battery units, in order to correspondingly keep down the complexity of the connection for large battery voltages. Such small battery units are also referred to as battery blocks. In the case of such blocks, one pole of the first cell and one pole of the last cell are respectively led out from the block housing. The connection between the cells of the block is usually correspondingly led out on the inside (very often through the housing wall of the individual cells). Very often, block units of 6 V and 12 V are used in the area of lead-acid rechargeable batteries. The most well known of these is the starter battery for motor vehicles, where nowadays 12 V block batteries are encountered (in the past, 6 V block batteries were also installed).

BRIEF SUMMARY OF THE INVENTION

The object of the present invention is therefore to provide a rechargeable battery cell and a battery that are inexpensive, can provide high levels of power for short times and at the same time have a high capacity. The rechargeable battery cell and the battery are also preferably as lightweight, small and inexpensive as possible.

This object is achieved by the rechargeable battery cell and the battery according to the claims. The respective dependent claims provide advantageous developments of the rechargeable battery cell according to the invention and the battery according to the invention.

A rechargeable battery cell according to the invention has at least one energy-optimized cell unit and at least one power-optimized cell unit. A cell unit is understood here as meaning a pair comprising an anode and cathode as well as the other possible components assigned to this pair, such as for example a separator. A cell unit is therefore an electrode assembly of in each case a cathode and an anode and also preferably a separator.

The power-optimized cell unit is configured here such that a higher level of power can be generated with it than with the energy-optimized cell unit. At the same time, the energy-optimized cell unit is configured such that a higher amount of energy per volume of the energy-optimized cell unit and/or per mass of the energy-optimized cell unit can be stored with it than with the power-optimized cell unit. The mass of the cell unit is determined here in particular by the electrodes belonging to the cell unit. The volume of the cell unit is determined in particular by way of the dimensions (surface area and thickness) and also the spacing of the electrodes belonging to the cell unit.

For the idea according to the invention to be realized, it is not necessary that the energy-optimized cell unit or the power-optimized cell unit is optimized for specific values of the amount of energy or power. All that is decisive is that the power-optimized cell unit provides a higher level of power than the energy-optimized cell unit and a greater amount of energy can be stored with the energy-optimized cell unit than with the power-optimized cell unit. The cell units of lithium-ion cell units are preferred.

According to the invention, the at least one energy-optimized cell unit and the at least one power-optimized cell unit are arranged in a common cell housing. All of the elements that are arranged within the cell housing together form with the cell housing the rechargeable battery cell. The various cell units, that is to say power- and energy-optimized cell units, are arranged together within the cell housing. More preferably, a cell unit respectively has at least two electrodes with active materials, and particularly preferably a separator arranged between the electrodes. A cell unit respectively has in this case at least one cathode and at least one anode, which in the preferred case are separated by at least one separator. More preferably, pairs comprising a cathode and an anode are respectively understood as a cell unit, so that, in the case where a number of energy-optimized electrodes and a number of power-optimized electrodes are present in a rechargeable battery cell, a pair comprising an anode and a cathode is respectively regarded as a cell unit.

The rechargeable battery cell has in this case a number of energy-optimized cell units and/or a number of power-optimized cell units.

In the rechargeable battery cell according to the invention, preferably all of the electrodes or all of the cell units, that is to say the at least one energy-optimized cell units and the at least one power-optimized cell units, are arranged in the same electrolyte; the electrolyte therefore surrounds all of the cell units and can flow between different cell units.

More preferably, energy-optimized cell units and power-optimized cell units differ in the thickness of their electrodes. The electrodes are configured here in a two-dimensional form, their surface area particularly preferably being rectangular. The thickness of the electrode is that extent of the electrode that is perpendicular to its surface-area extent. The electrodes of the energy-optimized cell units more preferably have a greater thickness than the electrodes of the power-optimized cell units. Correspondingly, the power-optimized cell units therefore have a smaller thickness than the electrodes of the energy-optimized cell units. According to the invention, therefore, preferably electrodes with optimized electrode thicknesses are respectively combined in a common cell housing at the level of the rechargeable battery cells.

Within the common cell housing, the cell units are preferably arranged one above the other with parallel planes of their electrodes. The plane of the electrode here is that plane in which the electrode extends with its surface area.

The rechargeable battery cell according to the invention preferably has a plurality of energy-optimized cell units and a plurality of power-optimized cell units, which means that the rechargeable battery cell has a number of energy-optimized cathodes and corresponding anodes and also a number of power-optimized cathodes and anodes. A pair comprising an anode and a cathode is respectively regarded here as a cell unit.

More preferably, at least one of the energy-optimized cell units is then arranged between two of the power-optimized cell units and/or at least one of the power-optimized cell units is arranged between two of the energy-optimized cell units. In particular, power-optimized and energy-optimized cell units may be arranged alternately next to one another.

It is preferred if the power-optimized cell units are connected in parallel with one another and/or the energy-optimized cell units are connected in parallel with one another. Particularly preferably, all of the positive electrodes of the energy-optimized cell units are in electrical contact with a common first positive conducting lead and all of the positive electrodes of the power-optimized cell units are in contact with a common second positive conducting lead. As a result, the respective cell units can together be contacted from the outside. It is particularly preferred in this case that the first positive conducting lead, which connects the energy-optimized cell units to one another, is in electrical contact with the second positive conducting lead, which connects the power-optimized cell units to one another, by way of at least one resistor, preferably only by way of one resistor. Alternatively, all of the negative electrodes of the energy-optimized cell units may be in electrical contact with a common first negative conducting lead and all of the negative electrodes of the power-optimized cell units may be in electrical contact with a common second negative conducting lead. In this case, it is preferred if the first negative conducting lead is in electrical contact with the second negative conducting lead by way of at least one resistor, preferably only by way of at least one resistor. The negative conducting leads may, however, also be in contact directly. The resistors can limit equalizing currents between energy-optimized and power-optimized cell units. On account of the differences in the depth of discharge with respect to the rated capacity between the individual cell units that occur during discharging, caused by the different current loads, equalizing currents with very high current peaks would occur between the cell units during the rest phase. These equalizing currents can be limited by means of the resistors described.

An outer positive and/or negative conducting-lead element may also be in direct electrical contact with the common positive or negative conducting lead of the electrodes of the power-optimized cell units. It is also possible that an outer positive and/or negative conducting-lead element is in direct electrical contact with the common positive or negative conducting lead of the electrodes of the energy-optimized cell units.

The rechargeable battery cell according to the invention may be configured as a modular system, different types of electrode being combined in a common cell housing and optimized in the cell housing with regard to the application requirements. As described in detail further below, the invention also provides a battery in which various rechargeable battery cells (in particular power-optimized and energy-optimized cells) are connected to one another in a housing, thereby likewise making it possible for the battery to be configured and optimized with regard to the requirements of the application. One possible application of the rechargeable battery cell according to the invention and the battery according to the invention is for example that of starter batteries and small-traction batteries on the basis of lithium-ion technology.

As already described, the electrodes are preferably plate-like. The electrodes of the power-optimized cell units preferably have in this case a thickness of $\geq 10$ μm, preferably $\geq 50$ μm, particularly preferably $\geq 100$ μm and/or $\leq 200$ μm, preferably $\leq 150$ μm, particularly preferably $\leq 120$ μm. The electrodes of the energy-optimized cell units preferably have a thickness of $\geq 1$ μm, preferably $\geq 10$ μm, particularly preferably $\geq 15$ μm and/or $\leq 30$ μm, preferably $\leq 25$ μm, particularly preferably $\leq 20$ μm. More preferably, the electrodes of the energy-optimized and/or power-optimized cell units have rectangular plate surface areas. In this case, the length and/or the width of the plate surface area is preferably in the range of $\geq 2$ cm, preferably $\geq 10$ cm, particularly preferably $\geq 20$ cm and/or $\leq 40$ cm, preferably $\leq 30$ cm, particularly preferably $\leq 25$ cm.

With the at least one power-optimized cell unit, preferably a current rate with respect to a nominal capacity C of $\geq 20$ C, preferably $\geq 30$ C, particularly preferably $\geq 40$ C and/or $\leq 80$ C, preferably $\leq 70$ C, particularly preferably $\leq 60$ C, can be generated. With the at least one energy-optimized cell unit, preferably a power of $\geq 1$ C, preferably $\geq 3$ C, particularly preferably $\geq 5$ C and/or $\leq 10$ C, preferably $\leq 8$ C, particularly preferably $\leq 6$ C, can be generated.

The capacity of a battery is the amount of charge that can be taken under the respective conditions in the unit ampere hours [Ah].

The energy content of a battery is the amount of energy that can be taken under the respective conditions in the unit watt hours [Wh].

The values of the capacity and the energy content may also be dependent on other conditions and ambient factors.

Such conditions may be: temperature, discharge current, discharge cut-off voltage, charge state of the battery and degree of aging of the battery.

The rated capacity indicates how much charge can be taken from the fully charged battery (load state 100%) over a defined discharging period ($t_N$) of for example one hour with a defined current ($I_N$) at a defined temperature ($T_N$) up to an end voltage/discharge cut-off voltage ($U_s$ or $U_f$) (charge state of virtually 0%).

For example, for a lithium-ion cell it may be that: $C_N$=5.5 Ah, $t_N$=1 h, $I_N$=5.5 amperes, $U_s$=2.5 V, $T_N$=25° C.

C Rate:

The C rate or C value indicates the amount of charge current/discharge current or charge current/discharge current in amperes in relation to the (divided by the) nominal total capacity. The indication of a C rate or a C value is becoming increasingly popular, since it allows the intended use of the rechargeable battery to be defined very well.

For example, a battery for hybrid applications may be a 3.6 V lithium-ion cell with a 5.5 Ah rated capacity and a discharge current rate of C/1, i.e. 5.5 amperes of discharge current over a period of 1 hour up to a discharge cut-off voltage of 2.5 V.

The invention also relates to a battery with at least two different rechargeable battery cells. In this case, at least two different rechargeable battery cells are selected from at least one power-optimized rechargeable battery cell, at least one energy-optimized rechargeable battery cell and at least one consumer rechargeable battery cell. At the battery level, various types of cells are therefore accommodated in a common battery housing. This allows the requirements of the battery with respect to the power delivery and stored energy to be investigated and a tailor-made solution that optimally meets the requirements to be respectively produced at the cell level and the battery level. In this case, a higher level of power can be generated with the power-optimized rechargeable battery cell than with the energy-optimized rechargeable battery cell and than with the consumer rechargeable battery cell. With the energy-optimized rechargeable battery cell, a higher amount of energy per volume of the energy-optimized rechargeable battery cell and/or per mass of the energy-optimized rechargeable battery cell can be stored than with the power-optimized rechargeable battery cell and than with the consumer rechargeable battery cell. Once again, what matters is not the absolute levels of power and amounts of energy, but rather their relationship to one another in the various rechargeable battery cells that form the battery. Consumer rechargeable battery cells are understood as meaning rechargeable battery cells that are produced in standardized housings, usually 18650 or 26650 (cylindrical housing). Such rechargeable battery cells have the advantage of great availability and low costs. However, the capacity to provide high power, in particular at low temperatures below −25° C., is limited and the typical rated capacities are only 2 to 3 Ah.

A consumer cell may therefore be understood as meaning rechargeable batteries that are mass produced with low costs, which are predominantly used in the nonindustrial sector or nonprofessional sector, such as for example in laptop batteries/power tools/portable consumer electronics such as photo cameras. The rechargeable batteries are characterized by mass production and low price on account of the high degree of uniformity of the dimensions.

According to the invention, the at least two different rechargeable battery cells are arranged in a common housing. Normally, each rechargeable battery cell may additionally also have a housing of its own.

A preferred arrangement provides that the rechargeable battery cells are of a flat extent, which means that they are made to extend much further in one plane than in the thickness perpendicular to that plane. It is then preferred here for there to be a plurality of rechargeable battery cells of one type and a plurality of rechargeable battery cells of another type in the battery, at least one of the rechargeable battery cells of one type being arranged between two rechargeable battery cells of at least one other type. In particular, here the rechargeable battery cells of different types may be arranged alternately next to one another. The rechargeable battery cells are preferably arranged one above the other with parallel surface areas, in which they extend two-dimensionally.

More preferably, the battery is realized with power-optimized rechargeable battery cells and energy-optimized rechargeable battery cells. In this case, a positive terminal of the energy-optimized rechargeable battery cells may then preferably be in electrical contact with a positive terminal of the at least one power-optimized rechargeable battery cell by way of at least one resistor, preferably only by way of at least one resistor, an outer positive terminal of the battery preferably being in direct electrical contact with the positive terminal of the power-optimized rechargeable battery cell or with the positive terminal of the at least one energy-optimized rechargeable battery cell. It is particularly preferred for the positive terminal of the energy-optimized rechargeable battery cell to be in electrical contact with the outer terminal by way of the at least one resistor, preferably only by way of the at least one resistor. It is also possible that a negative terminal of the at least one energy-optimized rechargeable battery cell is in electrical contact with a negative terminal of the at least one power-optimized rechargeable battery cell by way of at least one resistor, preferably by way of only at least one resistor. Here, too, preferably an outer negative terminal of the battery is in direct electrical contact with the negative terminal of the power-optimized rechargeable battery cell. It is further preferred that here, too, the negative terminal of the energy-optimized rechargeable battery cells is in electrical contact with the outer terminal by way of the at least one resistor, preferably only by way of the at least one resistor. Here, too, the resistor has the advantageous effect that equalizing currents between energy-optimized and power-optimized cells are limited. On account of the differences in the depth of discharge with respect to the rated capacity between the individual cells that occur during discharging, caused by the different current loads, equalizing currents with very high current peaks would occur between the cells during the rest phase. These equalizing currents can be limited by means of the resistors described.

In the battery it is possible that the resistor is arranged inside or outside the battery housing in which the rechargeable battery cells are accommodated. The rechargeable battery cells of one particular type, that is to say the energy-optimized type, the power-optimized type and the consumer type, may respectively have a common contact after they are outside the battery housing. If the resistor is arranged outside the battery housing, it may be arranged between the corresponding contacts of these common contacts.

In a particularly advantageous configuration of the battery according to the invention, the at least one power-optimized rechargeable battery cell is electrically contacted with the at least one energy-optimized rechargeable battery cell by way of a DC/DC converter. Here the power-optimized rechargeable battery cells and/or the energy-optimized rechargeable battery cells may form a power-optimized block or an energy-optimized block, the corresponding block being connected in parallel with the DC/DC converter, so that the blocks are in contact by way of the DC/DC converter. Within a block, a number of rechargeable battery cells of the corresponding type may be connected in parallel and/or in series. The DC/DC converter converts the voltage of the one block to that of the other block, for example the voltage of the energy-optimized rechargeable battery cell to the voltage of the power-optimized rechargeable battery cell.

More preferably, the at least one power-optimized rechargeable battery cell has a rated capacity of $\geq 1$ Ah, preferably $\geq 2$ Ah, particularly preferably $\geq 4$ Ah, particularly preferably $\geq 5.5$ Ah and/or $\leq 10$ Ah, preferably $\leq 8$ Ah, particularly preferably $\leq 6$ Ah. The at least one energy-optimized rechargeable battery cell preferably has a rated capacity of $\geq 20$ Ah, preferably $\geq 30$ Ah, particularly preferably $\geq 40$ Ah and/or $\leq 200$ Ah, preferably $\leq 150$ Ah, particularly preferably $\leq 100$ Ah, particularly preferably $\leq 50$ Ah.

It is preferred if all of the rechargeable battery cells are of the same electrochemical construction, in particular if the anode material, the cathode material and the electrolyte are identical in all of the rechargeable battery cells that are used. This allows permanent potential differences between the cells on account of different cell potentials and an overcharging or undercharging of the cells on account of different working windows for the cell voltage to be avoided.

It is possible to lead the terminals of the energy-optimized cells and the power-optimized cells separately out of the battery housing to the outside by way of four poles. Outside the battery housing there are therefore four poles or terminals, one pole being a positive terminal of the power-optimized cells, one being a negative terminal of the power-optimized cells, a further pole being a positive terminal of the energy-optimized cells and one pole being a negative terminal of the energy-optimized cells. This configuration provides the possibility of switching the power-optimized cells on or off depending on the level of the loading current by way of a quick measurement with a current integrator or comparator/shunt, in order not to overload the energy-optimized cells with high discharging currents and/or not to expose the power-optimized cells continually to cyclic operation. This allows the lifetime of the overall system to be prolonged.

The provision of a DC/DC converter makes it possible to use rechargeable battery cells with different anode and/or cathode materials with corresponding voltages. Thus, for example, anode and cathode materials of the energy-optimized rechargeable battery cells may comprise different materials than anodes and cathodes of the power-optimized rechargeable battery cells. In this way it is not only possible to optimize cells in terms of energy and power by way of their mechanical structure, but it is also possible to optimize the cells by way of their electrochemical properties. Therefore, an energy-optimized rechargeable battery cell may have different electrochemistry than a power-optimized rechargeable battery cell.

The cell units of the rechargeable battery cell according to the invention and/or the rechargeable battery cells of the battery according to the invention are preferably lithium-ion cells or lithium-ion cell units.

The modular system according to the invention at cell level and at battery level in a common cell housing or battery housing provides the possibility of a flexible design with regard to the application intended for the battery.

The battery according to the invention may therefore be, for example, a starter battery or a small-traction battery. Correspondingly, the rechargeable battery cell according to the invention may be a rechargeable battery cell of a starter battery and/or of a small-traction battery.

The invention therefore makes it possible to use different rechargeable battery cells or cell units that are optimized with regard to energy and/or power as well as anode and/or cathode materials. The rechargeable battery cells or cell units may be configured in various numbers of parallel connections at cell level in a cell housing or in a battery housing to achieve the optimum properties with regard to power, energy, weight and/or costs. It is possible to connect different rechargeable battery cell types, such as power-optimized, energy-optimized and price-optimized types, in a common battery housing to form a battery and thereby also to optimize the battery with regard to cost, weight and volume. The preferred use of DC/DC converters leads to a further cost and/or weight optimization, since individual rechargeable battery cells with different voltage levels on account of different cathode and/or anode materials are also possible here.

The invention is intended to be explained below by way of example on the basis of a number of figures. In these, the same reference signs designate the same or corresponding features. The features described in the examples may also be realized independently of the actual example in other configurations of the invention and may be combined with one another in any way desired.

DESCRIPTION OF THE INVENTION

Figure 1:
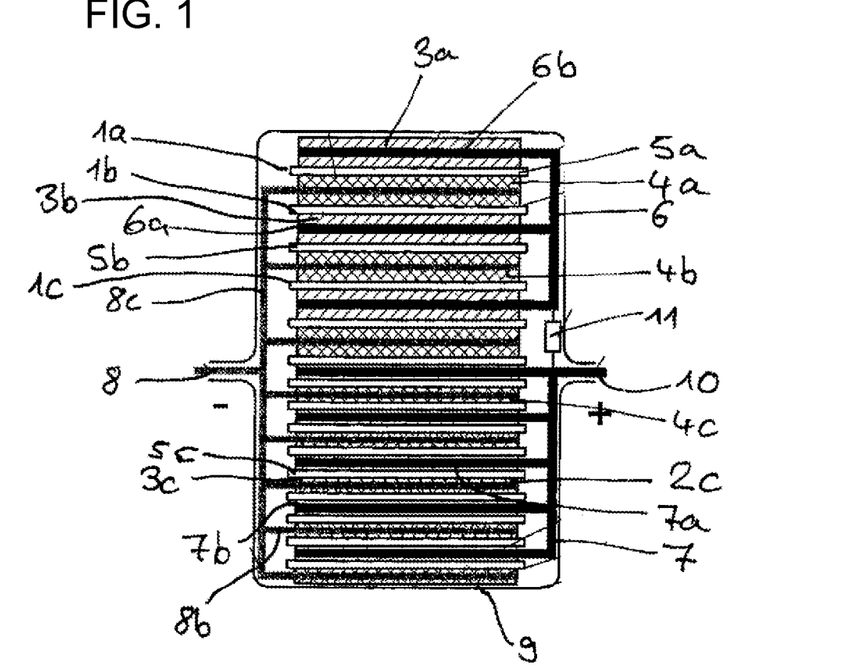
FIG. 1 shows a rechargeable battery cell according to the invention in section.

FIG. 1 shows a section through a rechargeable battery cell according to the invention with a multiplicity of cell units $1a$, $1b$, $1c$, $2a$, $2b$, $2c$. The cell units $1a$, $1b$, $1c$, $2a$, $2b$, $2c$ respectively have a cathode $3a$, $3b$, $3c$ and an anode $4a$, $4b$, $4c$. The anode and the cathode of a given cell unit $1a$, $1b$, $1c$, $2a$, $2b$, $2c$ are respectively separated by a separator $5a$, $5b$, $5c$. The rechargeable battery cell shown has on the one hand energy-optimized cell units $1a$, $1b$, $1c$ and on the other hand power-optimized cell units $2a$, $2b$, $2c$. In this case, the electrodes $3a$, $3b$, $4a$, $4b$ of the energy-optimized cell units $1a$, $1b$, $1c$ have a greater thickness than the electrodes $3c$, $4c$ of the power-optimized cell units $2a$, $2b$, $2c$.

The anodes $4a$, $4b$ are respectively electrically contacted by a copper conducting lead $8a$, $8b$, which leads are brought together in a common conducting lead $8c$ and can be contacted with the outside by an outer conducting-lead element $8$.

The cathodes are respectively contacted by aluminum conducting leads $6a$, $6b$, $7a$, $7b$. In this case, all of the conducting leads $6a$, $6b$ of the energy-optimized cell units $1a$, $1b$, $1c$ are brought together in a common conducting lead $6$ within the housing $9$. All of the conducting leads $7a$, $7b$ of the power-optimized cell units $2a$, $2b$, $2c$ are brought together within the housing $9$ in a common conducting lead $7$. An outer conducting lead $10$ for the contacting of the cathodes is electrically connected directly to the conducting leads $7a$, $7b$ or the common conducting lead $7$ of the power-optimized cell units $2a$, $2b$. The conducting leads $6a$, $6b$ or the common conducting lead $6$ of the energy-optimized cell units $1a$, $1b$, $1c$ is or are electrically contacted with the outer conducting-lead element by way of a resistor $10$.

According to the invention, all of the cell units $1a$, $1b$, $1c$, $2a$, $2b$, $2c$ are arranged in a common housing $9$, though the individual cell units $1a$, $1b$, $1c$, $2a$, $2b$, $2c$ for their part are not arranged in individual housings. There is therefore only one housing $9$, in which all of the cell units $1a$, $1b$, $1c$, $2a$, $2b$, $2c$ are arranged.

In the example shown, the electrodes are arranged one above the other, made to extend two-dimensionally with surface areas parallel to one another. A conducting lead $6a$, $6b$, $7a$, $7b$ contacts the corresponding electrode $3a$, $3b$, $3c$, $4a$, $4b$, $4c$ respectively at a midpoint in the direction of the thickness. Arranged between each respective anode and the neighboring cathode is a separator $5a$, $5b$, $5c$.

The cell housing may for example comprise or consist of aluminum composite foil.

The resistor $11$ is electrically insulated from an electrolyte $12$ inside the housing $9$. The electrolyte $12$ surrounds all of the cell units $1a$, $1b$, $1c$, $2a$, $2b$, $2c$; therefore, all of the cell units are in the same electrolyte $12$.

Figure 2:
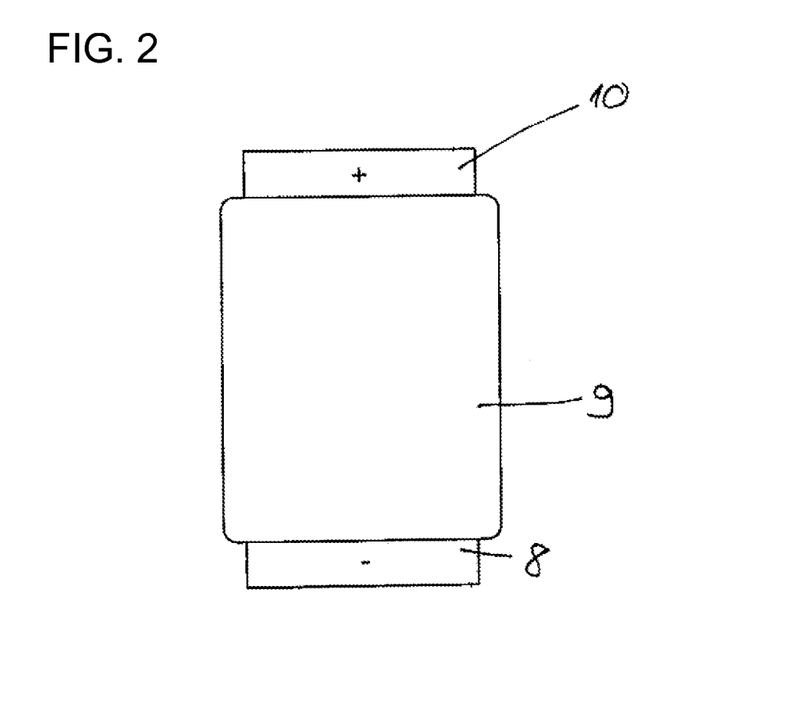
FIG. 2 shows a cell housing with conducting-lead elements of a rechargeable battery cell according to the invention.

FIG. 2 shows a rechargeable battery cell according to the invention, as it is shown in FIG. 1, in a view from outside. The cell housing $9$ is configured here in a rectangular form with rounded corners and extends substantially two-dimensionally in the plane of the figure. On opposite sides of the cell housing $9$ there is arranged on the one hand the positive conducting-lead element $10$ and on the other hand the negative conducting-lead element $8$, which are formed here as rectangular contacts which extend in the plane of the figure and consequently substantially two-dimensionally in the plane of the area extent of the housing $9$.

Figure 3:
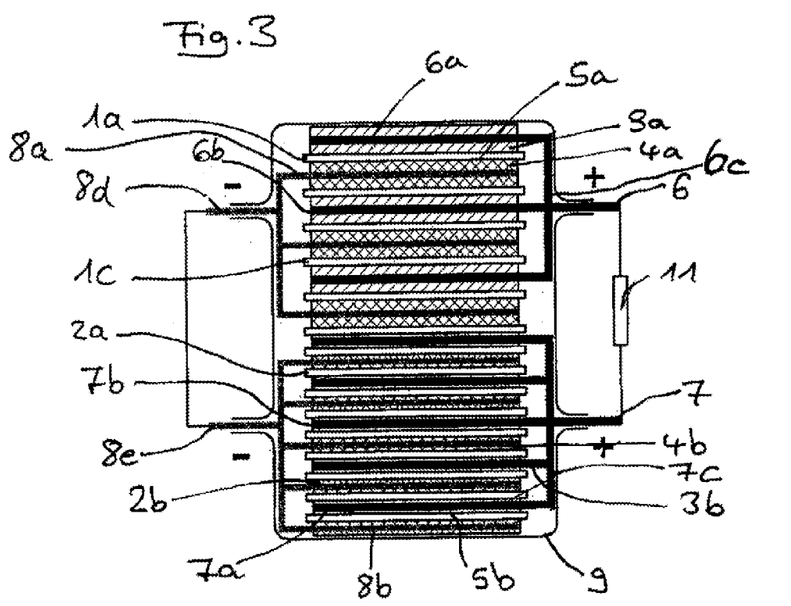
FIG. 3 shows a further rechargeable battery cell according to the invention in section.

FIG. 3 shows a further example of a rechargeable battery cell according to the invention in a sectional view. As in the example shown in FIG. 1, the rechargeable battery cell has three energy-optimized cell units $1a$, $1b$, $1c$ and five power-optimized cell units $2a$, $2b$. Each of the cell units has a cathode $3a$, $3b$ and an anode $4a$, $4b$. Once again all of the cathodes are respectively contacted by way of a conducting lead $6a$, $6b$, $7a$, $7b$ and all of the anodes are respectively contacted by way of a conducting lead $8a$, $8b$.

Unlike in the example shown in FIG. 1, the cell units of the same type can be contacted together from the outside and independently of the cell units of the other type. For this purpose, the cathode conducting leads $6a$, $6b$ are connected to a common conducting lead $6c$, which is electrically contacted with an outer conducting-lead element $6$, by way of which the energy-optimized electrodes can be contacted from the outside. The cathode conducting leads $7a$, $7b$ of the power-optimized cell units are brought together in a common conducting lead 7c within the housing and can be contacted from the outside by way of an outer conducting-lead element 7.

Correspondingly, the anode conducting leads 8a, 8b of the energy-optimized cell unit can be electrically contacted together from the outside by way of a common outer conducting-lead element 8b and the anode conducting leads of the power-optimized cell units 2a, 2b can be contacted together by way of an outer conducting-lead element 8e.

As also in FIG. 1, a resistor 11 is provided, by way of which the cathodes of the energy-optimized cell units are contacted with the cathodes of the power-optimized cell units. However, while the resistor 11 in FIG. 1 is arranged within the housing 9, in FIG. 3 it is arranged outside the cell housing 9. The embodiment shown in FIG. 3, in which the energy-optimized and power-optimized cell units can be contacted independently from the outside, is particularly advantageous if the power-optimized cells are intended to be capable of switching on or off, depending on a load current. For this purpose, the load current may be measured by means of a device that is not shown and the power-optimized cell units switched on or off by means of a switch that is not shown. In this embodiment, the resistor 11 would not be present.

Figure 4:
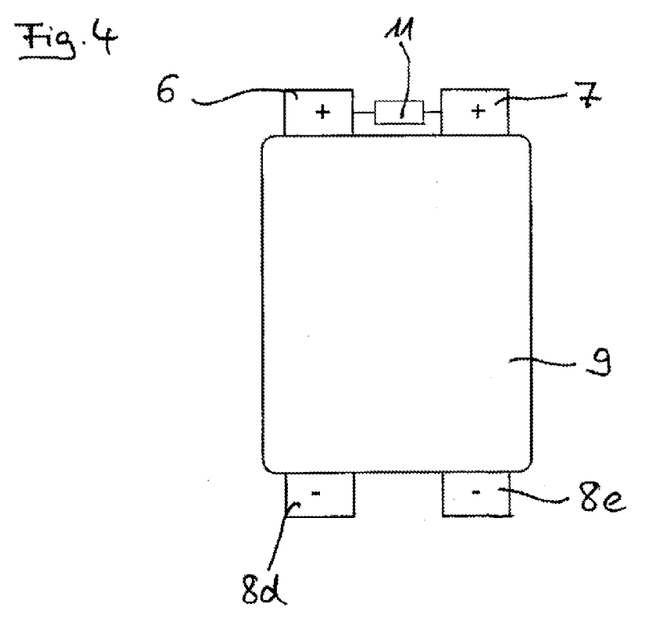
FIG. 4 shows a cell housing, as can be used for the rechargeable battery cell shown in FIG. 3.

FIG. 4 shows a view from outside of the rechargeable battery cell shown in FIG. 3. The housing 9 is here once again configured in a rectangular form and made to extend two-dimensionally in the plane of the figure. The corners are once again rounded. Thus, two positive outer conducting-lead elements 6 and 7 and two negative outer conducting-lead elements 8d and 8e are provided. In this case, the energy-optimized cell units can be contacted by way of the outer conducting-lead element 6 and the outer conducting-lead element 8d and the power-optimized cell units can be contacted by way of the outer conducting-lead element 7 and the outer conducting-lead element 8e. The resistor 11 is arranged between the outer conducting-lead elements 6 and 7.

Figure 5:
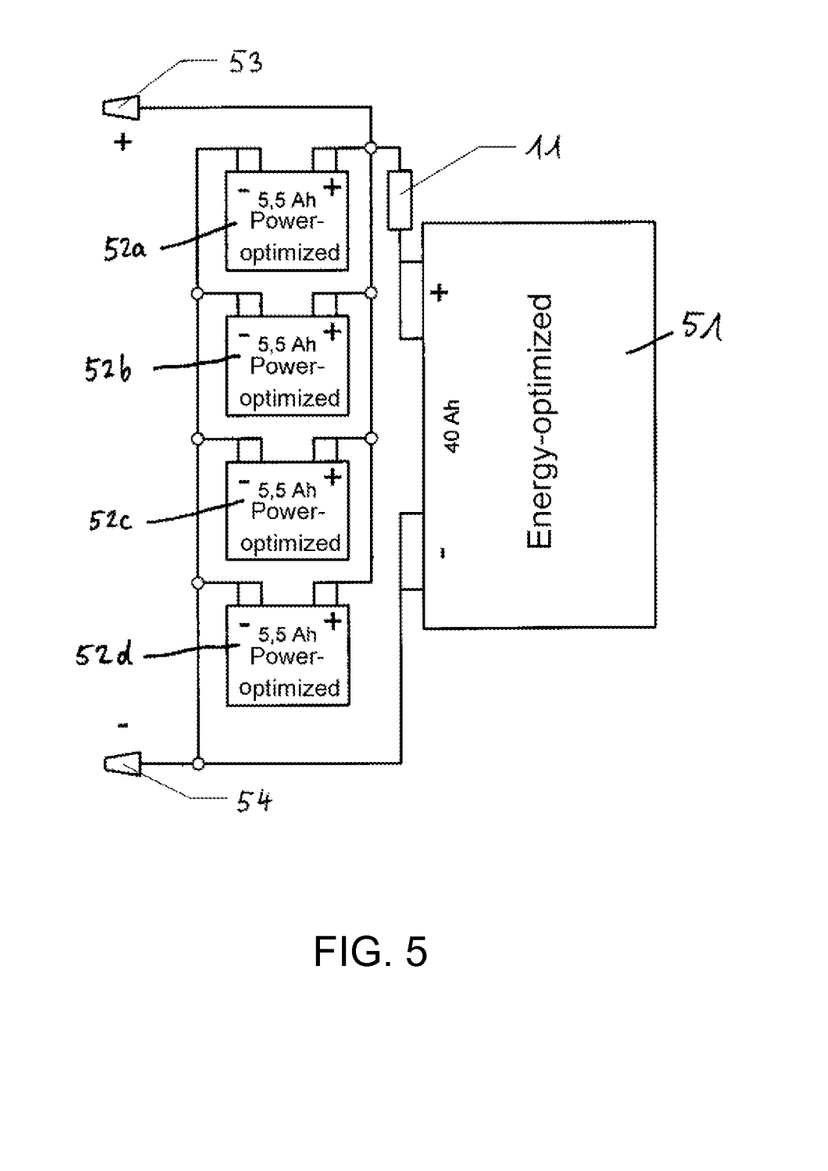
FIG. 5 shows an equivalent circuit diagram of a battery according to the invention with four power-optimized rechargeable battery cells and one energy-optimized rechargeable battery cell.

FIG. 5 shows an equivalent circuit diagram of a battery according to the invention. The battery has here, in a common battery housing that is not shown, four power-optimized rechargeable battery cells 52a, 52b, 52c, 52d, which respectively have a capacity of 5.5 Ah. The battery additionally has an energy-optimized rechargeable battery cell 51, which in the example shown has a capacity of 40 Ah. The battery has a positive pole 53 and a negative pole 54. Within the battery, the power-optimized rechargeable battery cells 52a-52d are connected in parallel with one another. The energy-optimized rechargeable battery cell 51 is connected in parallel with the parallel connection comprising the power-optimized rechargeable battery cells 52a-52d. In this case, however, the positive pole 53 of the battery is electrically contacted directly with the positive terminals of the power-optimized rechargeable battery cells 52a-52d, while the positive pole of the energy-optimized rechargeable battery cell is contacted with the positive pole 53 of the battery by way of a series resistor 11. The battery shown has a rated capacity of over 60 Ah.

Figure 6:
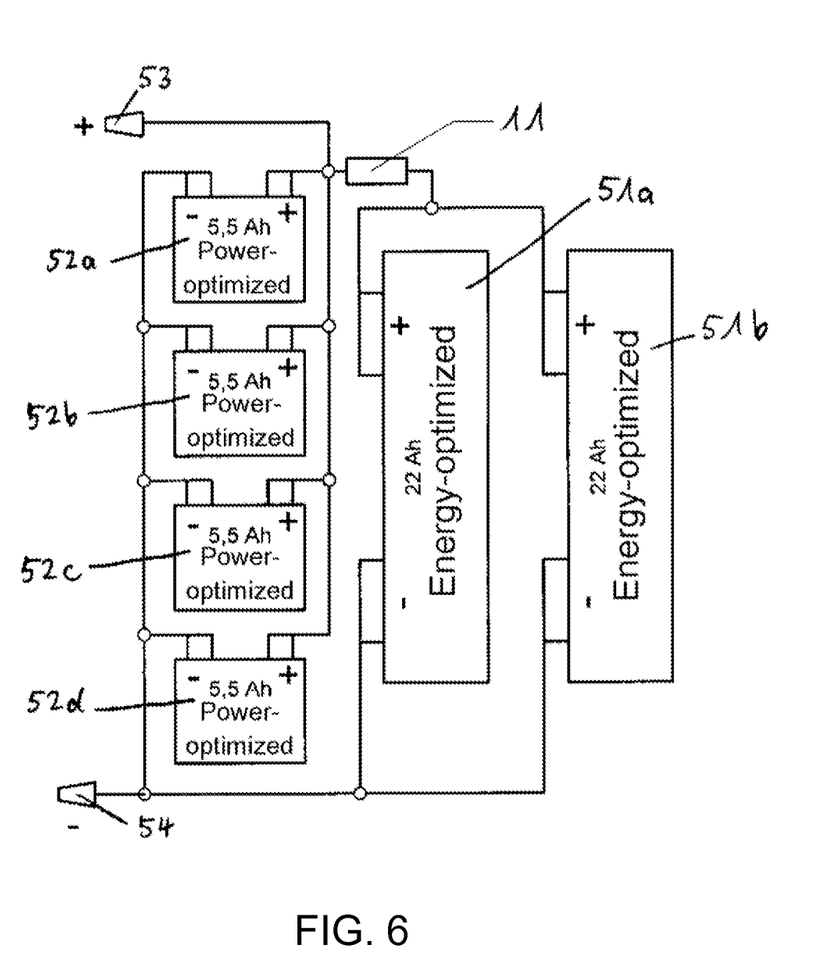
FIG. 6 shows a battery according to the invention with four power-optimized rechargeable battery cells and two energy-optimized rechargeable battery cells.

FIG. 6 shows an equivalent circuit diagram of a battery according to the invention, which is made up of four power-optimized rechargeable battery cells 52a, 52b, 52c, 52d and two energy-optimized rechargeable battery cells 51a, 51b. The power-optimized rechargeable battery cells 52a-52d have once again respectively a capacity of 5.5 Ah. The energy-optimized cell units 51a, 51b respectively have a capacity of 22 Ah. As in FIG. 5, the power-optimized rechargeable battery cells 52a-52d are connected in parallel with one another. The energy-optimized cell units 51a and 51b are likewise connected in parallel with one another. In addition, the parallel connection comprising the energy-optimized cell units 51a, 51b is connected in parallel with the parallel connection comprising the power-optimized cell units 52a-52d. Here, the positive pole 53 of the battery is directly contacted with the positive poles of the power-optimized cell units 52a-52d, while the positive pole of the energy-optimized cell units 51a, 51b is contacted with the positive pole 53 of the battery by way of a series resistor 11. As also in FIG. 5, the negative poles of the power-optimized cell units 52a-52d and the negative poles of the energy-optimized cell units 51a, 51b are contacted directly with the negative terminal 54 of the battery.

Both in FIG. 5 and in FIG. 6, though not shown here, consumer-type rechargeable battery cells may also be provided and, in a way corresponding to the rechargeable battery cells shown, may be connected in parallel with one another and likewise connected in parallel with rechargeable battery cells of another type, it being possible if appropriate for further series resistors to be provided between the parallel connections of the consumer-type rechargeable battery cells and rechargeable battery cells of another type.

In all of the examples shown, alternatively or in addition, a series resistor may also be provided between negative poles of the power-optimized, energy-optimized and, if applicable, consumer-type rechargeable battery cells.

Figure 7:
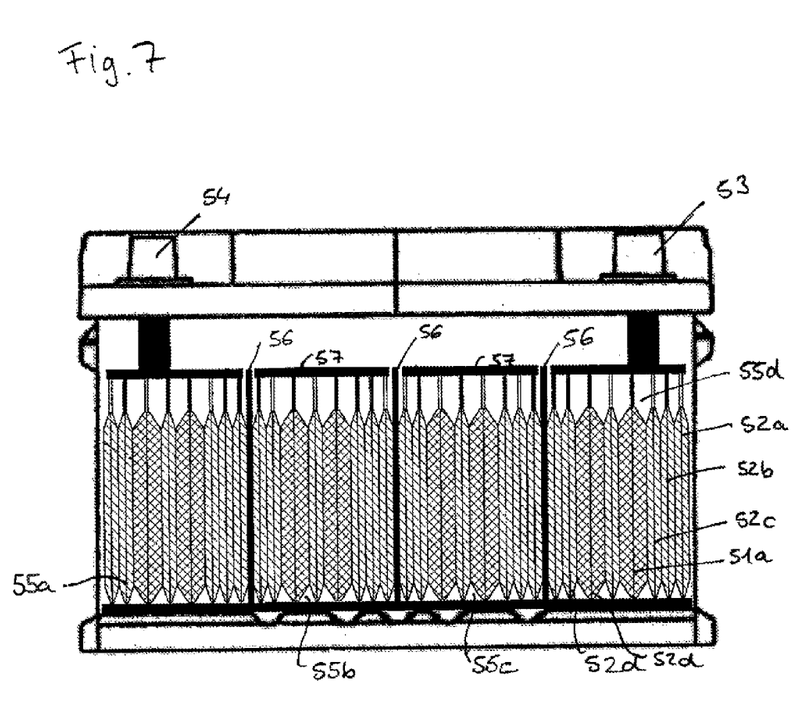
FIG. 7 shows a section through the battery according to the invention.

FIG. 7 shows a section through a battery according to the invention with four packs 55a, 55b, 55c, 55d, each pack having 6 power-optimized rechargeable battery cells 52a, 52b, 52c, 52d and two energy-optimized rechargeable battery cells 51a, 51b. The cell packs 55a-55d are respectively separated from one another by separating walls 56. Within each of the cell packs 55a-55d, the rechargeable battery cells 51a, 51b, 52a-52d are arranged next to one another with planes parallel to one another. The connection of the rechargeable battery cells corresponds to that shown in FIG. 6.

In each cell pack 55a-55d, the energy-optimized rechargeable battery cells 51a, 51b are arranged between power-optimized cell units 52a-52d and are separated from one another by them. Viewed left to right, therefore, in each cell pack 55a-55d there are firstly two power-optimized cell units, then an energy-optimized cell unit, then again a power-optimized cell unit, followed by an energy-optimized cell unit and this is finally followed by three power-optimized cell units arranged next to one another. The battery can be contacted from the outside by way of the battery poles 53 and 54. Rechargeable battery cells of a pack are respectively contacted by a busbar 57.

Figure 8:
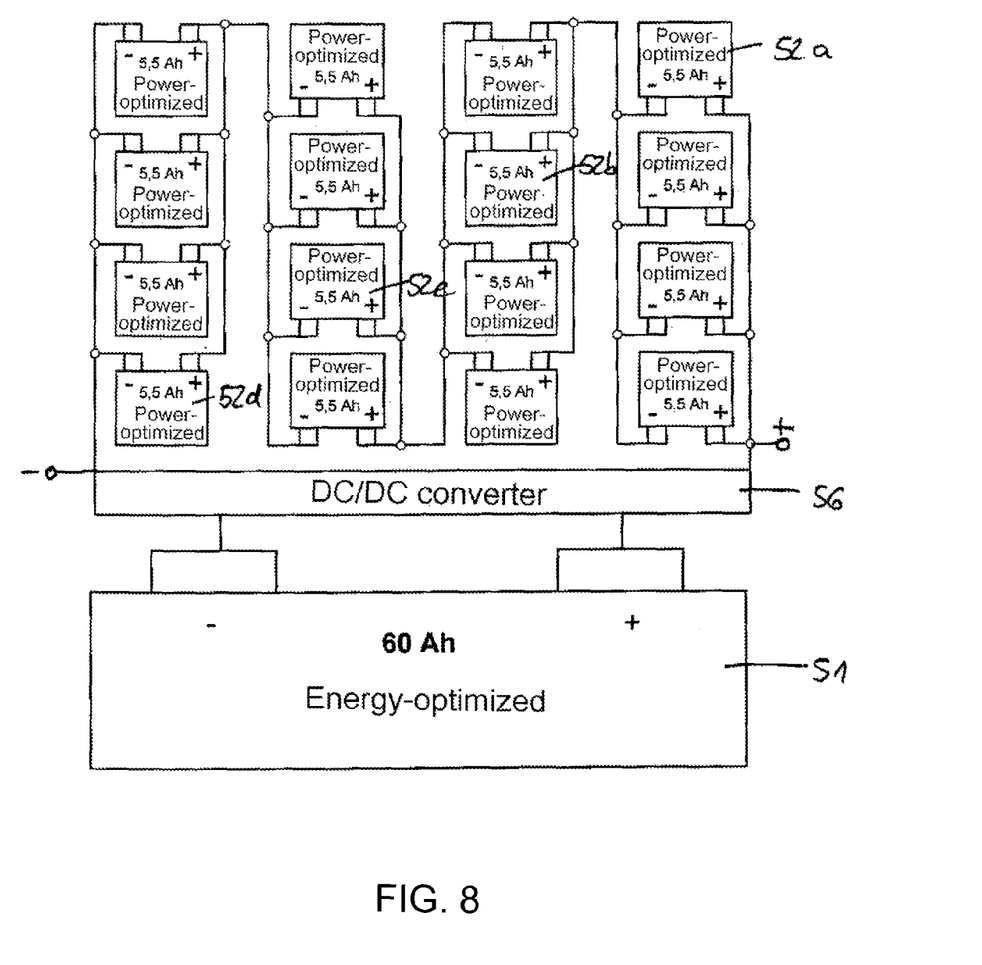
FIG. 8 shows a battery according to the invention with a DC/DC converter.

FIG. 8 shows a battery according to the invention with a DC/DC converter 56. The battery shown in FIG. 8 has on the one hand 16 power-optimized rechargeable battery cells 52a, 52b, 52c, 52d. Of these power-optimized rechargeable battery cells 52a-52d, four rechargeable battery cells are respectively connected in parallel with one another, so that four blocks of parallel-connected rechargeable battery cells 52a-52d are obtained. The four blocks are then connected in series with one another; therefore, four of these blocks are connected in series one behind the other. The entire series connection of all the power-optimized rechargeable battery cells is then connected by its positive pole and its negative pole to the DC/DC converter 56. Connected to two other inputs of the DC/DC converter is an energy-optimized rechargeable battery cell 51. By means of the DC/DC converter 56, the voltage of the energy-optimized cell 51 can be converted to the level of the voltage of the connection of the 16 power-optimized rechargeable battery cells 52a-52d, so that in such a connection power-optimized rechargeable battery cells can also be connected with energy-optimized rechargeable battery cells that have a different voltage level, for example because they have a different electrochemistry. In this battery, it would be possible for a voltage to be tapped off from the outside at the outer terminals of the connection of the power-optimized rechargeable battery cells 52a-52d.

The battery according to the invention makes it possible for example to connect together a 12 V 60 Ah lead-acid battery with a requirement for a cold-starting current of about 600 A and a rated capacity of 60 Ah comprising a combination of four power-optimized parallel-connected cells each with a capacity of 5.5 Ah (the weight per cell is about 290 g) and two energy-optimized parallel-connected cells each of 22 Ah (weight per cell about 580 g), as shown for example in FIG. 5. In addition, a combination of for example four power-optimized cells with a capacity of 5.5 Ah and one energy-optimized cell with a capacity of 40 Ah (weight per cell about 1050 g) is also possible. These combinations of cells make it possible in this example to obtain altogether a starting current of about 600 A with a rated capacity of about 62 Ah (4×5.5 Ah+40 Ah) or 66 Ah (4×5.5 Ah+2×22 Ah) with a total weight of 2320 g and 2210 g, respectively. In comparison with this, for the same starting currents and rated capacities, use of exclusively power-optimized cells each with a capacity of 5.5 Ah and the parallel connection of 12 cells necessary for this would give a weight of 3480 g, and use of energy-optimized cells each of a capacity of 22 Ah in a series-parallel connection of 7 cells would give a weight of 4060 g. The comparison of the resultant weights of the different connections clearly illustrates the advantage of the battery according to the invention. Thus, for example, a starter battery or a small-traction battery meeting the requirement for starting power and rated capacity can be optimized with regard to volume, weight and costs.

Figure 9:
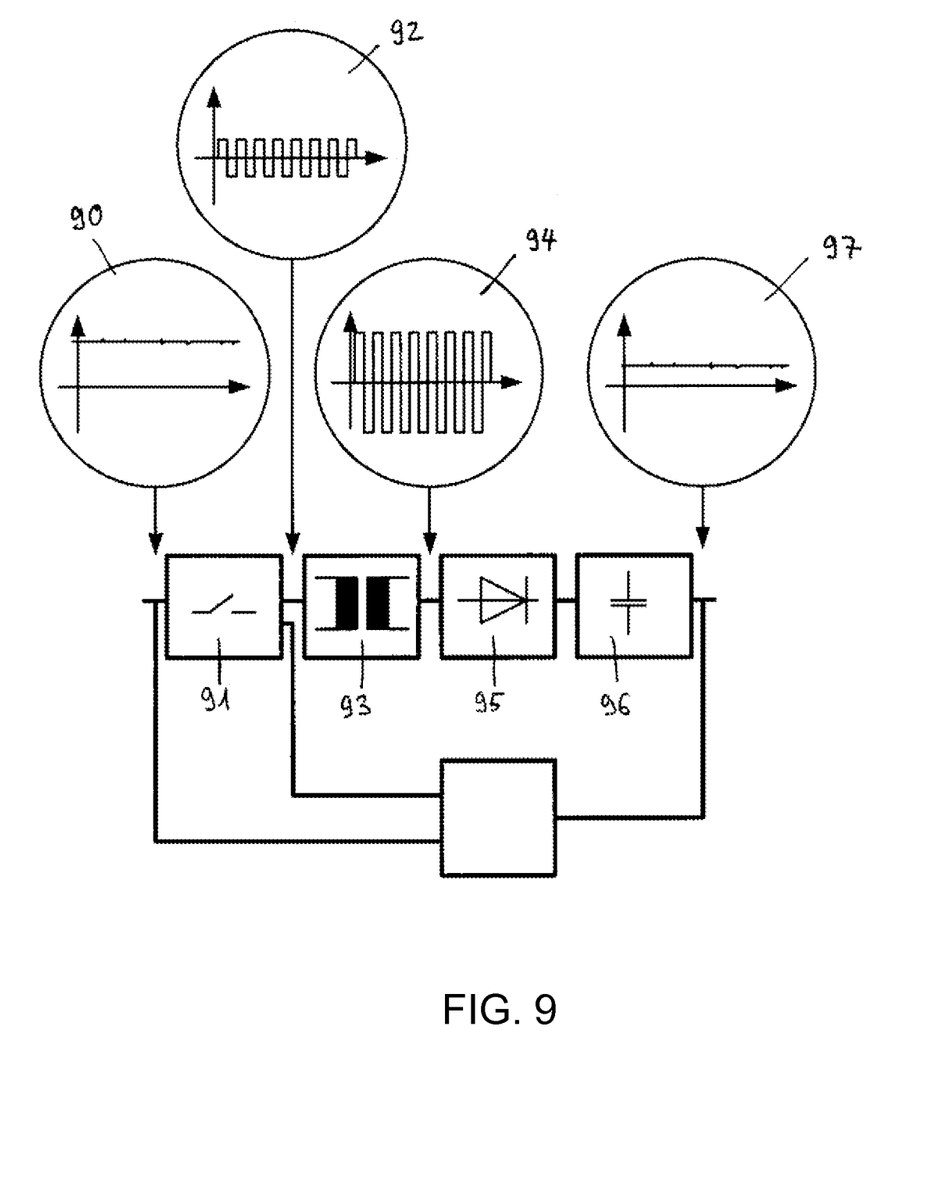
FIG. 9 shows the basic structure of a DC/DC converter.

FIG. 9 shows the basic structure of a DC/DC converter. The task of the DC/DC converter is to transform direct voltage of one amplitude (voltage value) into direct voltage of another amplitude (voltage value), in a way similar to what a transformer does for AC voltage. By way of example, the function will be explained on the basis of FIG. 9. Here, a DC voltage 90 is first converted by an RF electronic switch 91 into an AC voltage 92. A transformer 93 converts the AC voltage 92 into an AC voltage 94 of a different amplitude. This is then rectified by a rectifier 95 and smoothed by a smoothing device 96. Finally, a new DC voltage 97 is output.

The invention claimed is:

1. A rechargeable battery cell, comprising:
at least one energy-optimized cell unit having at least two electrodes with active materials and a separator disposed between said electrodes of said at least one energy-optimized cell unit;
  at least one power-optimized cell unit, said power-optimized cell unit configured such that a higher level of power can be generated with said power-optimized cell unit than with said energy-optimized cell unit and said energy-optimized cell unit configured such that a higher amount of energy of at least one of per volume of said energy-optimized cell unit or per mass of said energy-optimized cell unit can be stored with said energy-optimized cell unit than with said power-optimized cell unit, said at least one power-optimized cell unit having at least two electrodes with activated materials and a separator disposed between said electrodes of said at least one power-optimized cell unit;
  said electrodes of said energy-optimized cell unit having a greater thickness in a direction perpendicular to a plane of a plate of said electrodes than said power-optimized cell unit; and
  a common cell housing, said at least one energy-optimized cell unit and said at least one power-optimized cell unit disposed in said common cell housing.

2. The rechargeable battery cell according to claim 1, wherein said at least one energy-optimized cell unit and said at least one power-optimized cell unit are disposed one above the other with parallel planes of said electrodes.

3. The rechargeable battery cell according to claim 1, wherein:
said at least one energy-optimized cell unit is one of a plurality of energy-optimized cell units;
said at least one power-optimized cell unit is one of a plurality of power-optimized cell units; and
at least one of said energy-optimized cell units is disposed between two of said power-optimized cell units and at least one of said power-optimized cell units is disposed between two of said energy-optimized cell units.

4. The rechargeable battery cell according to claim 3, wherein said electrodes of said energy-optimized cell units and of said power-optimized cell units include positive electrodes and negative electrodes;
further comprising a common first positive conducting lead;
further comprising a common second positive conducting lead;
further comprising at least one resistor, said common first positive conducting lead being in electrical contact with said common second positive conducting lead by way of said at least one resistor; and
wherein all of said positive electrodes of said energy-optimized cell units are in electrical contact with said common first positive conducting lead and in that all of said positive electrodes of said power-optimized cell units are in contact with said common second positive conducting lead.

5. The rechargeable battery cell according to claim 4, further comprising an outer positive conducting-lead element, said outer positive conducting-lead element being in direct electrical contact with at least one of said common second positive conducting lead of said electrodes of said power-optimized cell units or said common first positive conducting lead of said electrodes of said energy-optimized cell units.

6. The rechargeable battery cell according to claim 1, wherein:
said electrodes of said power-optimized cell units are plate-shaped with a thickness of $\geq 10$ µm and $\leq 150$ µm;
said electrodes of said energy-optimized cell units are plate-shaped with a thickness of $\geq 1$ µm and $\leq 30$ µm; and
said electrodes of at least one of said energy-optimized or said power-optimized cell units are plate-shaped with a rectangular plate surface area, with a length of $\geq 2$ cm and $\leq 40$ cm and a width of $\geq 2$ cm and $\leq 40$ cm.

7. The rechargeable battery cell according to claim 3, further comprising:
a DC/DC converter;
a positive conducting lead for said power-optimized cell units connected to said DC/DC converter;
a negative conducting lead for said power-optimized cell units connected to said DC/DC converter;
a positive conducting lead for said energy-optimized cell units connected to said DC/DC converter; and
a negative conducting lead for said energy-optimized cell units connected to said DC/DC converter.

8. The rechargeable battery cell according to claim 1, wherein:
with said at least one power-optimized cell unit, a current rate with respect to a nominal capacity C of ≥20 C and ≤80 C can be generated; and
with said at least one energy-optimized cell unit, a power of ≥1 C and ≤10 C can be generated.

9. The rechargeable battery cell according to claim 3,
wherein said electrodes of said energy-optimized cell units and of said power-optimized cell units include positive electrodes and negative electrodes;
further comprising a common first negative conducting lead;
further comprising a common second negative conducting lead;
further comprising at least one resistor, said common first negative conducting lead being in electrical contact with said common second negative conducting lead by way of said at least one resistor; and
all of said negative electrodes of said energy-optimized cell units are in electrical contact with said common first negative conducting lead and all of said negative electrodes of said power-optimized cell units are in contact with said common second negative conducting lead.

10. The rechargeable battery cell according to claim 9, further comprising a negative conducting-lead element, said negative conducting-lead element is in direct electrical contact with at least one of said common second negative conducting lead of said electrodes of said power-optimized cell units or said common first negative conducting lead of said electrodes of said energy-optimized cell units.

11. The rechargeable battery cell according to claim 1, wherein:
said electrodes of said power-optimized cell units are plate-shaped, with a thickness of ≥50 μm and ≤150 μm;
said electrodes of said energy-optimized cell units are plate-shaped with a thickness of ≥10 μm and ≤25 μm; and
said electrodes of at least one of said energy-optimized or said power-optimized cell units are plate-shaped with a rectangular plate surface area, with a length of ≥10 cm and ≤30 cm, and a width of ≥10 cm and ≤30 cm.

12. The rechargeable battery cell according to claim 1, wherein:
said electrodes of said power-optimized cell units are plate-shaped, with a thickness of ≥100 μm and ≤120 μm;
said electrodes of said energy-optimized cell units are plate-shaped with a thickness of ≥15 μm and ≤20 μm; and
said electrodes of at least one of said energy-optimized or said power-optimized cell units are plate-shaped with a rectangular plate surface area, with a length of ≥20 cm and ≤25 cm and a width of ≥20 cm and ≤25 cm.

13. The rechargeable battery cell according to claim 1, wherein:
with said at least one power-optimized cell unit, a current rate with respect to a nominal capacity C of ≥30 C and ≤70 C can be generated; and
with said at least one energy-optimized cell unit, a power of ≥3 C and ≤8 C can be generated.

14. The rechargeable battery cell according to claim 1, wherein:
with said at least one power-optimized cell unit, a current rate with respect to a nominal capacity C of ≥40 C and ≤60 C can be generated; and
with said at least one energy-optimized cell unit, a power of ≥5 C and ≤6 C can be generated.

15. A battery, comprising:
at least two different rechargeable battery cells selected from the group consisting of at least one power-optimized rechargeable battery cell, at least one energy-optimized rechargeable battery cell and at least one consumer rechargeable battery cell, said at least one energy-optimized rechargeable battery cell having at least two electrodes with active materials and a separator disposed between said electrodes of said at least one energy-optimized cell unit, said at least one power-optimized cell unit having at least two electrodes with activated materials and a separator disposed between said electrodes of said at least one power-optimized cell unit, and said electrodes of said energy-optimized cell unit having a greater thickness in a direction perpendicular to a plane of a plate of said electrodes than said power-optimized cell unit;
said power-optimized rechargeable battery cell configured such that a higher level of power can be generated with said power-optimized rechargeable battery cell than with said energy-optimized rechargeable battery cell and than with said consumer rechargeable battery cell;
said energy-optimized rechargeable battery cell configured such that a higher amount of energy per at least one of volume of said energy-optimized rechargeable battery cell or mass of said energy-optimized rechargeable battery cell can be stored with said energy-optimized rechargeable battery than with said power-optimized rechargeable battery cell and than with said consumer rechargeable battery cell; and
a common housing, said at least two different rechargeable battery cells disposed in said common housing.

16. The battery according to claim 15,
further comprising at least one resistor;
wherein said at least one power-optimized rechargeable battery cell has a positive terminal;
wherein said at least one energy-optimized rechargeable battery cell has a positive terminal in electrical contact with said positive terminal of said at least one power-optimized rechargeable battery cell by way of said at least one resistor;
further comprising an outer battery positive terminal being in direct electrical contact with said positive terminal of said power-optimized rechargeable battery cell; and
wherein said positive terminal of said energy-optimized rechargeable battery cell being in electrical contact with said outer battery positive terminal by way of said at least one resistor.

17. The battery according to claim 15, wherein:
said energy-optimized rechargeable battery cell is one of a plurality of energy-optimized rechargeable battery cells;
said power-optimized rechargeable battery cell is one of a plurality of power-optimized rechargeable battery cells;
at least one of said energy-optimized rechargeable battery cells is disposed between two of said power-optimized rechargeable battery cells; and
at least one of said power-optimized rechargeable battery cells is disposed between two of said energy-optimized rechargeable battery cells.

18. The battery according to claim 15, further comprising:
a measuring device with which a load current with which the battery is loaded can be measured; and
at least one switch with which said at least one power-optimized rechargeable battery cell can be switched on and off, depending on the load current measured.

19. The battery according to claim 15, further comprising a DC/DC converter, at least one of said at least one power-optimized rechargeable battery cell or said at least one consumer rechargeable battery cell is in electrical contact with said at least one energy-optimized rechargeable battery cell by way of said DC/DC converter.

20. The battery according to claim 15, wherein:
said at least one power-optimized rechargeable battery cell has a rated capacity of ≥1 Ah and ≤10 Ah; and
said at least one energy-optimized rechargeable battery cell has a rated capacity of ≥20 Ah and ≤200 Ah.

21. The battery according to claim 15,
further comprising at least one resistor;
wherein said at least one power-optimized rechargeable battery cell has a positive terminal;
wherein said at least one energy-optimized rechargeable battery cell has a positive terminal in electrical contact with said positive terminal of said at least one power-optimized rechargeable battery cell by way of only said at least one resistor;
further comprising an outer battery positive terminal being in direct electrical contact with said positive terminal of said power-optimized rechargeable battery cell; and
wherein said positive terminal of said energy-optimized rechargeable battery cell being in electrical contact with said outer battery positive terminal by way of only said at least one resistor.

22. The battery according to claim 15, wherein:
said at least one power-optimized rechargeable battery cell has a rated capacity of ≥2 Ah and ≤8 Ah; and
said at least one energy-optimized rechargeable battery cell has a rated capacity of ≥30 Ah and ≤150 Ah.

23. The battery according to claim 15, wherein:
said at least one power-optimized rechargeable battery cell has a rated capacity of ≥4 Ah and ≤6 Ah; and
said at least one energy-optimized rechargeable battery cell has a rated capacity of ≥40 Ah and ≤100 Ah.

24. The battery according to claim 15, wherein:
said at least one power-optimized rechargeable battery cell has a rated capacity of ≥5.5 Ah; and
said at least one energy-optimized rechargeable battery cell has a rated capacity of ≤50 Ah.

* * * * *